June 24, 1930.    C. W. McKINLEY ET AL    1,768,367
OIL FILTER

Filed May 11, 1927

Inventor
Charles W. McKinley &
Herbert G. Kamrath

By Blackmore, Spencer & Flint
Attorneys

Patented June 24, 1930

1,768,367

UNITED STATES PATENT OFFICE

CHARLES W. McKINLEY AND HERBERT G. KAMRATH, OF FLINT, MICHIGAN, ASSIGNORS TO A C SPARK PLUG COMPANY, OF FLINT, MICHIGAN, A COMPANY OF MICHIGAN

OIL FILTER

Application filed May 11, 1927. Serial No. 190,549.

This invention relates to purifiers or oil filters used on automotive vehicles and particularly to means for preventing the re-use or substitution of an old filter unit for a brand new one.

Oil filters become clogged after being in use for some time which necessitates the removal of the clogged filter unit and its replacement by a new filter unit. In the present invention use is made of a bag filter which is attached to a head secured to the inside of the cover of the sealed filter can. The filter bag is attached thereto and may be removed with the sealed can to allow for attachment of a new sealed can with an unused filter bag. A second head portion is positioned on the outside of the filter cover with connections for the inlet and outlet pipes.

Between the inner head and the filter bag there is placed a stamping which overlies the bolt holes through which the bolts are passed which secure the outer head to the inner head. This stamping is provided with bosses or burrs pressed thereinto and which project upwardly into the bolt openings. These bosses or burrs have a raised insignia or design of any suitable type on their surfaces where they are exposed to the action of the bolts and when the bolts are applied in place the ends thereof will come in contact with the burr and mutilate the design or insignia or entirely press the burr out of the stamping. The condition of the burr or boss will show to the purchaser of a new filter unit whether the bag has been recleaned and is being put back into service. If the burr is intact it is evidence that a brand new unit is being offered for sale, while if the burr is damaged or broken out it shows that a recleaned bag is being sold.

The invention is disclosed on the accompanying drawing in which.

Figure 1:
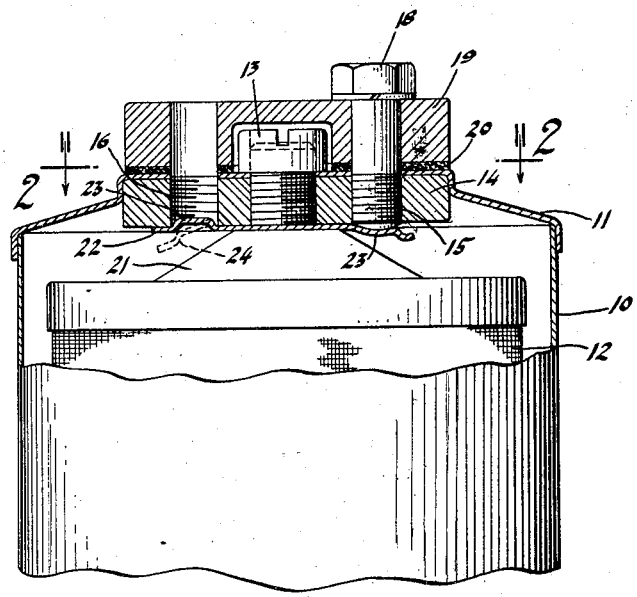
Fig. 1 is a transverse sectional view through a filter can showing the invention applied thereto.

Referring to the numbered parts on the drawing, 10 indicates a filter can of any suitable type, 11 the cover thereof and 12 the filtering material.

Removably secured to the inside of the cover head, by means of the nut 13, is a head 14 having bolt openings 15, 16 and 17 for the reception of bolts 18, which secure the inner and outer heads 14 and 19 to the filter. To make a tight fit between the outer head 19 and the cover 11, we make use of a gasket 20.

The filter bag 12 is attached to a frame 21 at the top of the filter bag in any suitable way and between this frame and the inner head 14 there is positioned a stamping 22 which has pressed therein burrs or bosses 23, which conform to and project upwardly into the bolt openings 15, 16 and 17. Each of these bosses has an insignia or a design thereon as indicated by the letters "A C" in Fig 2. From an inspection of the design conforming to the opening 17 in Fig. 2 it will be seen that the letters are sharp in outline. This condition of the design on all three of the burrs will be evidence that a new filter bag is being offered for sale.

By referring to the insignia shown at the opening 15 it will be noted that the letters are blurred and damaged, showing that a bolt has been passed through the opening 15 and has been screwed against the letters on the burr, causing them to become damaged and blurred as indicated. This condition will bring to the purchaser's attention the fact that the filter head and its attached bag have been previously used.

Figure 2:
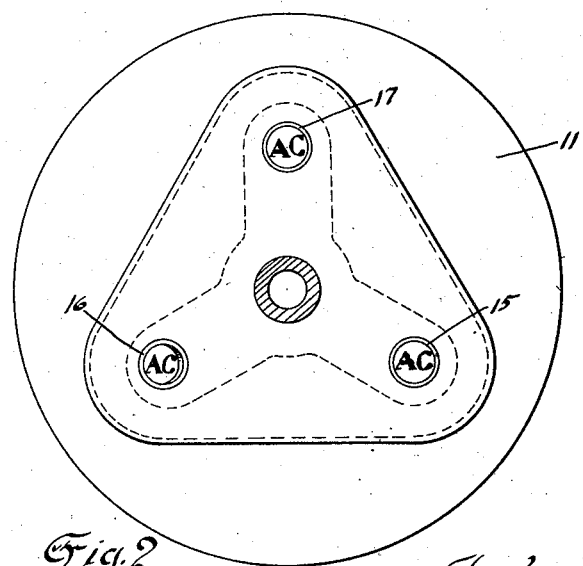
Fig. 2 is a section on the line 2—2 of Fig. 1 with the bolts removed.

By referring to the burr at the opening 16 in Fig. 2, it will be noted that the middle has been entirely punched out, as shown more clearly at 24 in dotted outline in Fig. 1. The damaging of the stamping 22 by punching out the burr 23 will also show that the filter has been used before.

If all three of the burrs are in sharp outline and not punched out or are in the condition as shown in the opening 17, the filtering material is new and has never been used, but if any one of the burrs is in the condition shown in the openings 15 or 16, it will evidence that an old or recleaned filter bag has been offered for sale.

The cover 11 is rigidly secured to the can 10 and cannot be removed without destroying both cover and can. This construction will prevent the replacement of the cover on the can and thereby remove the possibility of the substitution of a new stamping 22.

We claim:

1. In a purifier, a head having openings, a stamping attached to said head, pressed out portions on said stamping, and means passing through said openings for operating on said pressed out portions.

2. The combination of claim 1, said pressed out portions being concentric with said openings and said means comprising bolts to secure the head to the filter.

3. The combination of claim 1, a design on said pressed out portions which becomes mutilated when said means are passed into said openings.

4. In a purifier, a cover, a head, means for removably securing said head to said cover, a purifying medium secured to said head, a stamping secured between said head and medium, pressed out portions projecting into openings in said head, said pressed out portions becoming mutilated when said means are applied.

5. The combination of claim 4 and an insignia on said pressed out portions which is mutilated when said means is applied.

6. In a purifier, a head attached to said purifier, a purifying unit attached to said head, a stamping attached to said head, raised portions on said stamping, and means passing through said head for operating on said pressed out portions, the condition of said raised portions determining whether or not the unit has been used.

7. In a purifier, a cover, a head in said cover, a purifying medium attached to said head, and a burr mounted on said head for indicating whether the purifying medium has been used.

8. In a purifier, a cover, a head in said cover, a purifying medium attached to said head, and a stamping on said head having a plurality of burrs for indicating whether the purifying medium has been used.

9. In a purifier, a cover, a head in said cover, a purifying medium attached to said head, and means on said head comprising a plurality of burrs each having a raised design for indicating whether the purifying medium has been used.

In testimony whereof we affix our signatures.

CHARLES W. McKINLEY.
HERBERT G. KAMRATH.